(12) United States Patent
Gross

(10) Patent No.: US 11,922,455 B1
(45) Date of Patent: Mar. 5, 2024

(54) CLOSE-LOOP ADVERTISING SYSTEM AND METHOD

(71) Applicant: Idealab Studio, LLC, Pasadena, CA (US)

(72) Inventor: William Gross, Pasadena, CA (US)

(73) Assignee: Idealab Studio, LLC, Pasadena, CA (US)

( * ) Notice: Subject to any disclaimer, the term of this patent is extended or adjusted under 35 U.S.C. 154(b) by 12 days.

(21) Appl. No.: 16/874,852

(22) Filed: May 15, 2020

Related U.S. Application Data

(60) Provisional application No. 62/849,729, filed on May 17, 2019.

(51) Int. Cl.

| | | |
|---|---|---|
| *G06Q 30/02* | (2023.01) | |
| *G06Q 30/0201* | (2023.01) | |
| *G06Q 30/0242* | (2023.01) | |
| *G06V 20/00* | (2022.01) | |
| *G06V 20/10* | (2022.01) | |
| *H04N 7/18* | (2006.01) | |
| *G09F 7/00* | (2006.01) | |
| *G09F 9/35* | (2006.01) | |

(Continued)

(52) U.S. Cl.
CPC ..... *G06Q 30/0246* (2013.01); *G06Q 30/0201* (2013.01); *G06Q 30/0242* (2013.01); *G06V 20/00* (2022.01); *G06V 20/176* (2022.01); *H04N 7/181* (2013.01); *G09F 7/00* (2013.01); *G09F 9/35* (2013.01); *G09F 15/00* (2013.01); *G09F 21/04* (2013.01)

(58) Field of Classification Search
CPC .......... G06Q 30/0246; G06Q 30/0201; G06Q 30/0242
See application file for complete search history.

(56) References Cited

U.S. PATENT DOCUMENTS

2012/0030006 A1\* 2/2012 Yoder ................ G06Q 30/0207
705/14.41
2013/0085857 A1\* 4/2013 Bax ........................ G06Q 30/02
705/14.57

(Continued)

OTHER PUBLICATIONS

"Measurement and Analysis for Digital Signage" (Published by NetWorld Alliance in 2009 at www.networkdaliance.com and written by James Bickers and Dick Good) (Year: 2009).\*

*Primary Examiner* — James M Detweiler
(74) *Attorney, Agent, or Firm* — Knobbe, Martens, Olson & Bear LLP

(57) ABSTRACT

A verification system configured to determine when customers respond to a real-world ad unit is disclosed. The system comprises: a first camera, a second camera, and a processor. The first camera is mounted at a billboard promoting an associated merchant. The second camera is installed at the merchant where it is configured to capture images of people present at the merchant. The processor is configured to: receive images of a first set of people from the first camera at the billboard; receive images of a second set of people from the second camera at the merchant; and identify a subset of people that appear in the first set and then in the second set. The processor can then generate a conversion rate based on the first set of people and the third set of people. The advertising system is therefore a close-loop system for measuring the effectiveness of advertising.

10 Claims, 2 Drawing Sheets

(51) Int. Cl.
 *G09F 15/00* (2006.01)
 *G09F 21/04* (2006.01)

(56) References Cited

U.S. PATENT DOCUMENTS

2014/0149221 A1* 5/2014 Rycyna, III ........ G06Q 30/0264
 705/14.61
2018/0114251 A1* 4/2018 Zavesky ................ G06V 20/54
2020/0152032 A1* 5/2020 Jennings .......... G08B 13/19632
2020/0320573 A1* 10/2020 Harrison .............. H04B 17/318

\* cited by examiner

CLOSE-LOOP ADVERTISING SYSTEM AND METHOD

CROSS-REFERENCE TO RELATED APPLICATIONS

This application claims the benefit of U.S. Provisional Patent Application Ser. No. 62/849,729 filed May 17, 2019, titled "Close-loop advertising system and method," which is hereby incorporated by reference herein for all purposes.

TECHNICAL FIELD

The invention generally relates to a technique for confirming or otherwise validating the effectiveness of various forms of advertising. In particular, the invention relates to a system and method for determining when people visit a merchant in response to a real world ad.

BACKGROUND

People are constantly exposed to advertising, both real-world advertising and online advertising. While there are techniques to track the effectiveness of online ads, it is extremely difficult to determine just how effective real-world advertising is. Thousands of people may drive past a billboard next to the freeway, but just how many people will actually respond by visiting the merchant advertised in the ad or purchase something from the merchant? There is therefore a need for a technique to measure the conversion rate of real-world advertising media.

SUMMARY

The invention in the preferred embodiment is a novel verification system configured to determine if and when customers respond to a real-world ad unit such as a billboard. In the preferred embodiment, the system comprises: a first camera in proximity to an ad unit, a second camera, and a processor. The first camera is mounted on or near a billboard or other ad unit promoting an associated merchant facility. The first camera is configured to capture images of people that view the ad unit. The second camera is installed at the merchant facility where it is configured to capture images of people present at the merchant facility. The processor is configured to: receive images from the first camera and detect a first set of people that viewed the ad unit; receive images from the second camera and detect a second set of people at the merchant facility; and identify a subset of people that appeared in the first set of people and then appeared in the second set of people. The processor can then generate a conversion rate based on the overlap between the first set of people and the third set of people. The system is therefore a closed loop advertising system.

In the preferred embodiment, the ad unit is a billboard where it is available for public consumption. As used here, a billboard refers to any type of real-world ad unit that is displayed to a group of people in public, rather than an ad that is selected for and/or delivered to an individual person.

In some embodiments, the invention is a method of measuring an advertising conversion rate. The method comprises: receiving images of a first set of people in proximity to an advertising unit associated with a merchant facility; receiving images of a second set of people in proximity to the merchant facility; and identifying a third set of people that appear in the first set of people and the second set of people, and appear in the second set of people after appearing in the first set of people. Once identified, the processor can generate a conversion rate based on the overlap between the first set of people and the third set of people.

The invention in another embodiment is a novel verification system configured to determine if and when customers respond to a real-world ad unit based on the detection of a vehicle. In the preferred embodiment, the system comprises: a first camera in proximity to an ad unit, a second camera, and a processor. The first camera is mounted on or near a billboard or other ad unit promoting an associated merchant facility. The first camera is configured to capture images of vehicles in proximity to the ad unit. The second camera is installed at the merchant facility where it is configured to capture images of vehicles present at the merchant facility. The processor is configured to: receive images from the first camera and detect a first set of vehicles near the ad unit; receive images from the second camera and detect a second set of vehicles at the merchant facility; and identify a subset of vehicles that appeared in the first set of vehicles and then appeared in the second set of vehicles. The processor can then generate a conversion rate based on the first set of vehicles and the third set of vehicles.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The preferred embodiment of the present invention features an advertising system and method for measuring and validating the effectiveness of traditional forms of tangible advertising as well as digital advertising. To date, there has been no effective and reliable method of determining the conversion rate of billboards and other forms of advertising. Here, conversion rate refers to the percentage of people that visit a merchant facility, or take other action, after seeing a billboard or other ad unit, for example.

Figure 1:
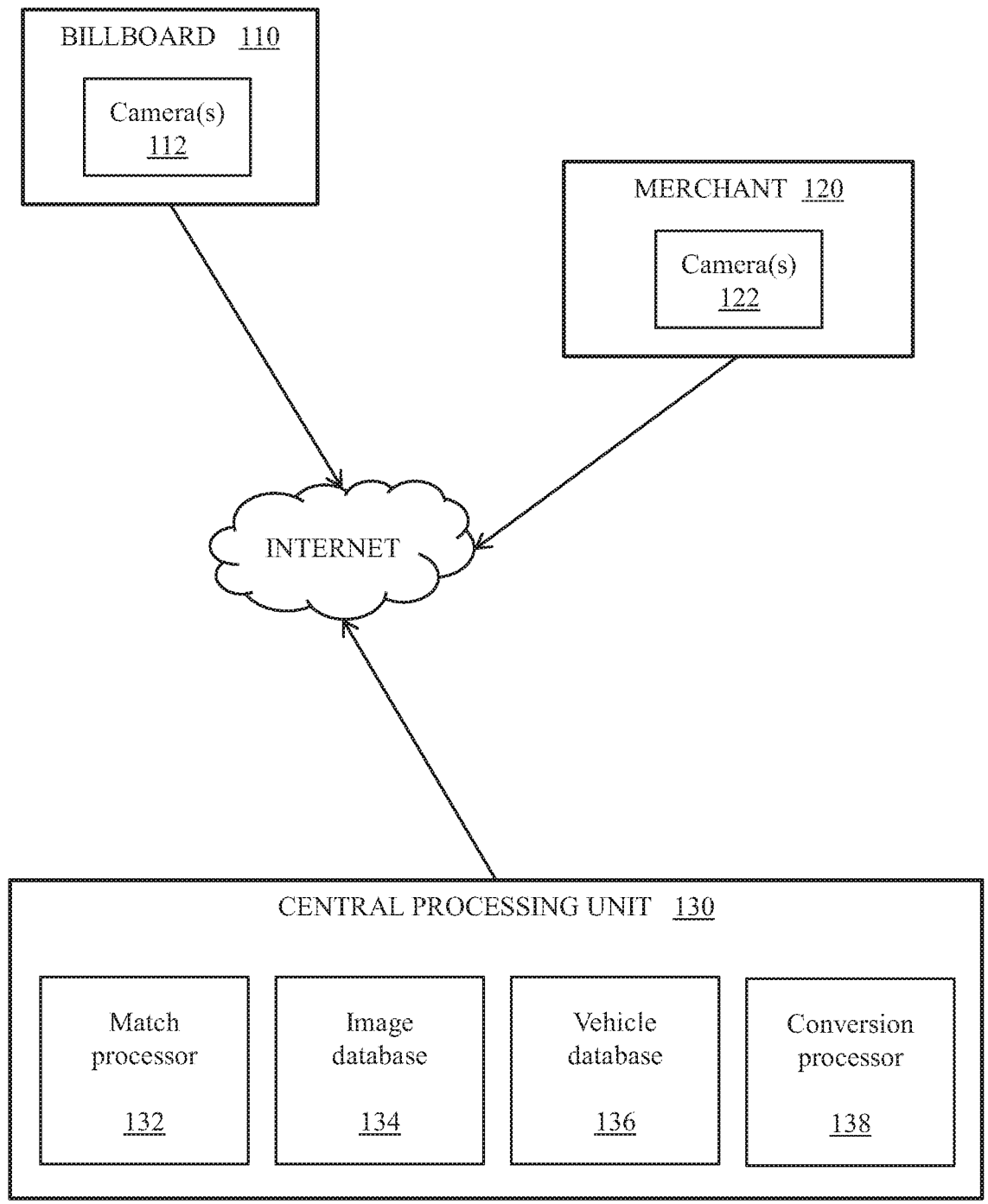
FIG. 1 is a functional block diagram of a system for measuring an advertising conversion rate, in accordance with a preferred embodiment of the present invention.
Figure 2:
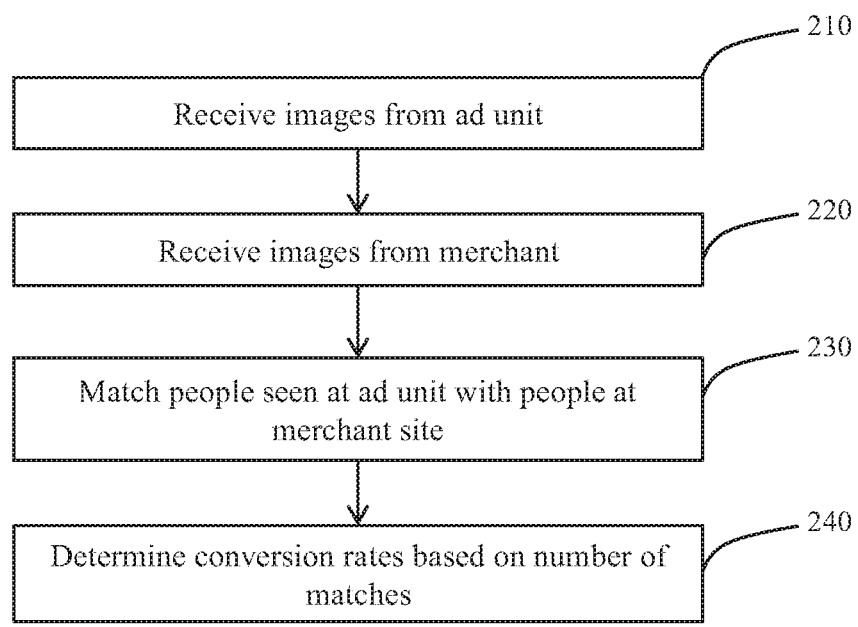
FIG. 2 is a process for measuring an advertising conversion rate, in accordance with a preferred embodiment of the present invention.

Illustrated in FIG. 1 is a functional block diagram of a network for measuring an advertising conversion rate. The network includes an ad unit 110, a merchant facility 120, and a central processing unit 130.

In the preferred embodiment, the ad unit 110 is a billboard with an internet-enabled camera 112 configured to capture images of people that pass by the billboard. The ad unit depicts an image or video promoting the merchant business. The ad unit can be a static or dynamic image on printed media, painted media, vinyl sheet, poster, LCD display, sign, building, automobile, truck, or scooter, for example. In each of these cases, the billboard includes at least a first camera 112 configured to acquire video of (a) people or vehicles passing by the ad unit or (b) people actually viewing (facing, seeing, and/or making eye-contact with) the ad unit.

The merchant facility 120 may take the form of any of a number of retail or commercial establishments including stores, shops, boutiques, booths, franchises, concessionaires, salons, banks and financial service centers, grocers, restaurants, bars, sporting venues, and dealerships, for example.

The merchant 120 includes at least a second internet-enabled camera 122 placed at the entry of facility or inside the facility being promoted in the advertisement unit 110. The second camera 122 is configured to acquire video of the people or vehicles coming to the merchant retail facility, entering the retail facility, and/or purchasing something at the retail facility.

The central processing unit (CPU) 130 is preferably a server or other computing system, configured to acquire the video from the first camera 112 as well as the second camera 122. The CPU 130 includes a matching processor 132, image database 134, vehicle database 136, and conversion processor 138.

In the preferred embodiment, the matching processor 132 is configured to detect or identify a first set of people present in images from the first camera 112, detect or identify a second set or people present in images from the second camera 122, and then detect or identify a third set of people that appear in the first set of people and then appear in the second set of people. It is the third set of people that were exposed to the billboard 110 and then proceeded to go to the merchant 120, which is the goal of placing an ad unit on the billboard.

In some embodiments, the conversion processor 138 calculates the conversion rate, which is the ratio of the number of people in the third set divided by the number of people in the first set. In other embodiments, the conversion rate is the number of people in the third set that made purchases divided by the number of people in the first set.

In this manner, the system can confirm the number of people that have acted in response to the ad unit and then charge the merchant a fee for driving customers to the merchant facility. In some embodiments, the merchant is charged a fee based on any actual purchases made by the people driven to the merchant in a predetermined period of time after being exposed to the ad unit, or charged a fee based on the distance customers traveled from the ad unit to the retail facility.

In the preferred embodiment, the people of the first set, second set, and third set are matched using a facial detection process, facial recognition process, or other object recognition technology, for example. In a second embodiment, the matching processor 132 is configured to match vehicles that pass by the ad unit and vehicles that drive to the merchant facility 120 to shop. In this configuration, the matching processor 132 detects a first set of vehicles that drive by the billboard 110, identifies a second set of vehicles that drive to merchant facility 120, and a subset of vehicles that appeared in the first set of vehicles and then in the second set of vehicles.

The system includes an image database 134 for storing video clips or image data associated with detected people and/or a vehicle database for storing video clips or image data associated with detected vehicles.

In a third embodiment, the ad unit is an online ad or other digital media displayed on the screen of a laptop computer or mobile phone, for example. The associated camera is built into the computer or mobile phone. This camera captures images or video of the people to which the ad unit is presented. Instead of video data, the user may be logged into a software application in which the name of the user is known, thereby obviating the need for video data. In parallel, a camera at the merchant facility acquires video of the people coming to the facility or making purchases at the facility.

As before, the CPU 130 receives the video from the user's laptop computer camera as well as the camera at the merchant facility 120. The CPU 130 then identifies people present in both videos based on facial recognition techniques, for example, known to those skilled in the art. The CPU 130 thus identifies and counts the number of people that received an ad impression and then traveled to the merchant facility 120. Portions of video from the two cameras with timestamps may be provided to the merchant as evidence of the consumer traffic directly generated in response to the ad unit. In this manner, the CPU 130 can validate conversion traffic and charge the merchant accordingly.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A system for measuring an advertising conversion rate, the system comprising:
   a processor;
   a first camera in proximity to an ad unit associated with and remote from a merchant facility, the first camera coupled to the processor via an Internet, wherein the first camera is configured to capture images of people exposed to the ad unit;
   a second camera at the merchant facility, wherein the second camera is configured to capture images of people making a purchase at the merchant facility, the second camera coupled to the processor via the Internet;
the processor configured to:
receive first images of a first set of people exposed to the ad unit from the first camera remote from them merchant facility coupled to the processor via the Internet, wherein the first images of the first set of people are timestamped;
receive second images of a second set of people making a purchase at the merchant facility from the second camera at the merchant facility coupled to the processor via the Internet, wherein the second images of the second set of people are timestamped;
identify a third set of people by using facial recognition programming to identify people appearing in the first images of the first set of people exposed to the ad unit and subsequently appearing in the second images of the second set of people making a purchase at the merchant facility;
determine a distance traveled by the identified third set of people from the ad unit to the merchant facility;
generate a conversion rate based on the first set of people and the identified third set of people; and
provide portions of the first images and corresponding timestamps in which the third set of people appear and portions of the second images and corresponding timestamps in which the third set of people appear to a merchant associated with the merchant facility to evidence that the ad unit was causal with respect to generating traffic to the merchant facility.

2. The system of claim 1, wherein the ad unit is a public advertisement.

3. The system of claim 2, wherein the public advertisement comprises a billboard.

4. The system of claim 2, wherein the public advertisement comprises printed media, painted media, vinyl sheet, a poster, an LCD display, a sign, a building, an automobile, a truck, or a scooter.

5. The system of claim 1, wherein the first camera is configured to capture images of people that view the ad unit.

6. The system of claim 1, wherein the first camera is configured to capture images of people that make eye contact with the ad unit.

7. A computer implemented method, the method comprising:
mounting a first networked camera in proximity to an advertising unit associated with, and remote from, a merchant facility;
installing a second networked camera at the merchant facility;
receiving, over a network and at a computer system comprising a processing device, first images from the first networked camera of a first set of people in proximity to the advertising unit associated with merchant facility, wherein the first images of the first set of people are timestamped;
receiving, over the network and at the computer system, second images from the second networked camera of a second set of people making a purchase at the merchant facility, wherein the second images of the second set of people are timestamped;
identifying a third set of people, via the computer system, by using facial recognition programming to identify people that: appear in the first images of the first set of people in proximity to the advertising unit, and appear in the second images of the second set of people making a purchase at the merchant facility after appearing in the first images of the first set of people;
determine a distance traveled by one or more people in the identified third set of people from the advertising unit to the merchant facility;
generating a conversion rate based on the first set of people and the identified third set of people; and
providing portions of the first images and corresponding timestamps in which the third set of people appear and portions of the second images and corresponding timestamps in which the third set of people appear to a merchant associated with the merchant facility to evidence that the advertising unit was causal with respect to generating traffic to the merchant facility.

8. The method of claim 7, wherein the advertising unit is a billboard.

9. The method of claim 7, the method further comprising:
receiving, over the network and at the computer system from a third camera configured to capture images of vehicles in proximity to a first image, third images of a first set of vehicles in proximity to the first image;
receiving, over the network and at the computer system from a fourth camera configured to capture images of vehicles in proximity to the merchant facility, fourth images of a second set of vehicles in proximity to the merchant facility; and
identifying a third set of vehicles, via the computer system, by using object recognition programming to identify vehicles appearing in the third images of the first set of vehicles in proximity to the first image and subsequently appearing in the fourth images of the second set of vehicles in proximity to the merchant facility.

10. A system comprising:
a first camera configured to capture images of vehicles in proximity to a first image, the first camera remote from a merchant facility;
a second camera proximate the merchant facility and configured to capture images of vehicles in proximity to the merchant facility;
a processor configured to:
receive, over a network and from the first camera remote from the merchant facility, first timestamped images of a first set of vehicles in proximity to the first image;
receive, over the network and from the second camera to proximate the merchant facility, second timestamped images of a second set of vehicles in proximity to the merchant facility;
identify a third set of vehicles by using object recognition programming to identify vehicles appearing in the first timestamped images of the first set of vehicles in proximity to the first image and subsequently appearing in the second timestamped images of the second set of vehicles in proximity to the merchant facility;
determine a distance traveled by one or more vehicles from the first image to the merchant facility;
generate a conversion rate based on the first set of vehicles and the identified third set of vehicles; and
provide portions of the first timestamped images and corresponding timestamps in which the third set of vehicles appear and portions of the second timestamped images and corresponding timestamps in which the third set of vehicles appear to a merchant associated with the merchant facility to evidence that the first image was causal with respect to generating traffic to the merchant facility.

* * * * *

UNITED STATES PATENT AND TRADEMARK OFFICE
CERTIFICATE OF CORRECTION

| | |
|---|---|
| PATENT NO. | : 11,922,455 B1 |
| APPLICATION NO. | : 16/874852 |
| DATED | : March 5, 2024 |
| INVENTOR(S) | : William Gross |

It is certified that error appears in the above-identified patent and that said Letters Patent is hereby corrected as shown below:

In the Claims

On Column 6, Line 48: In Claim 10, delete "to proximate" and insert -- proximate --.

Signed and Sealed this
Fourteenth Day of May, 2024

Katherine Kelly Vidal
*Director of the United States Patent and Trademark Office*